(12) United States Patent
Palett et al.

(10) Patent No.: US 7,267,078 B2
(45) Date of Patent: Sep. 11, 2007

(54) COMBINATION MAJOR APPLIANCE AND PET WATERING SYSTEM

(76) Inventors: Anthony Palett, 18343 Lister Ave., Eastpointe, MI (US) 48021; Justin Palett, 31458 Hunters Cir., Farmington Hills, MI (US) 48334

( * ) Notice: Subject to any disclaimer, the term of this patent is extended or adjusted under 35 U.S.C. 154(b) by 182 days.

(21) Appl. No.: 11/082,724

(22) Filed: Mar. 17, 2005

(65) Prior Publication Data

US 2006/0207515 A1    Sep. 21, 2006

(51) Int. Cl.
*A01K 7/00* (2006.01)
(52) U.S. Cl. ........................................ 119/78
(58) Field of Classification Search ................. 119/78, 119/74, 79, 80
See application file for complete search history.

(56) References Cited

U.S. PATENT DOCUMENTS

| | | | | |
|---|---|---|---|---|
| 4,138,967 A * | 2/1979 | Tamborrino | .................. | 119/78 |
| 4,329,940 A | 5/1982 | Humphries | .................. | 119/72 |
| 4,470,371 A | 9/1984 | Strickland | ..................... | 119/78 |
| 5,025,754 A * | 6/1991 | Plyler | ........................... | 119/73 |
| 5,138,890 A | 8/1992 | Wood | ...................... | 73/864.66 |
| 5,138,980 A | 8/1992 | Ewing | ......................... | 119/73 |
| 5,452,683 A * | 9/1995 | Poffenroth | .................... | 119/73 |
| 5,474,029 A * | 12/1995 | Hofer | .......................... | 119/73 |
| 5,782,202 A | 7/1998 | Strickland | ..................... | 119/78 |
| 5,813,363 A * | 9/1998 | Snelling | ...................... | 119/73 |
| 6,119,628 A | 9/2000 | Lorenzana et al. | ............ | 119/77 |
| 6,145,473 A | 11/2000 | Keisner | ........................ | 119/53 |
| 6,205,950 B1 | 3/2001 | Thompson, Jr. | ............ | 119/51.5 |
| 6,207,046 B1 * | 3/2001 | Yamashita et al. | .......... | 210/138 |
| 6,327,869 B1 * | 12/2001 | Shapiro et al. | ............... | 62/347 |
| 6,463,880 B1 | 10/2002 | Callingham | .................. | 119/78 |
| 6,843,205 B1 * | 1/2005 | Segreto | ........................ | 119/74 |
| 6,896,159 B2 * | 5/2005 | Crisp et al. | ............... | 222/146.6 |
| 7,007,500 B2 * | 3/2006 | Lee | ............................... | 62/389 |
| 7,108,094 B2 * | 9/2006 | Daniels | ........................ | 180/90 |
| 7,131,560 B2 * | 11/2006 | Hammond | ................... | 222/399 |

* cited by examiner

*Primary Examiner*—Teri Pham Luu
*Assistant Examiner*—Bethany L. Griles
(74) *Attorney, Agent, or Firm*—Gifford, Krass, Sprinkle, Anderson & Citkowski, PC

(57) ABSTRACT

A major appliance or cabinet unit integrates an automatically refillable water bowl including a liquid level sensor and an electrical or mechanical valve in fluid communication with a source or water. In the preferred embodiment the appliance is a refrigerator freezer with plumbing to an ice maker or other accessory to which the bowl can interconnect, though the invention is equally applicable to other appliances such as non-combined refrigerators and freezers, stoves, ranges, dishwashers, trash compactors, and cabinet units. Various optional accessories are disclosed, including a fan for drying water spilled from the bowl. The fan may be used for another purpose in the appliance, as in a condensing unit, or may be provided separately. A sensor may be included to disable the fan in the presence of a pet. The appliance preferably includes a cavity into which the bowl is situated, along with an optional light for illuminating the cavity. The invention may be factory installed or provided as an option or aftermarket add-on. As such, the appliance may include a knockout panel exposing a cavity into which the bowl is situated.

9 Claims, 2 Drawing Sheets

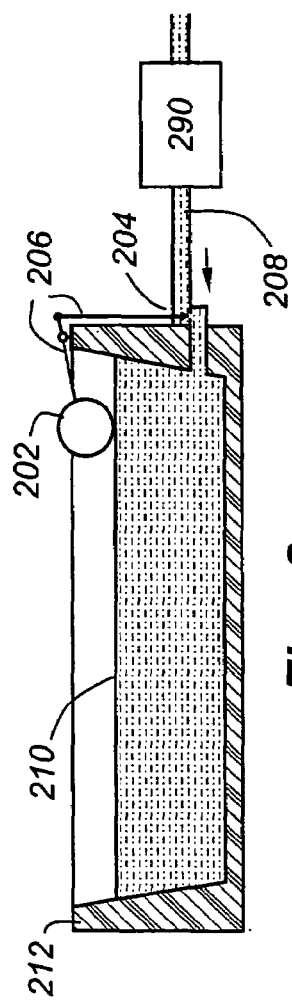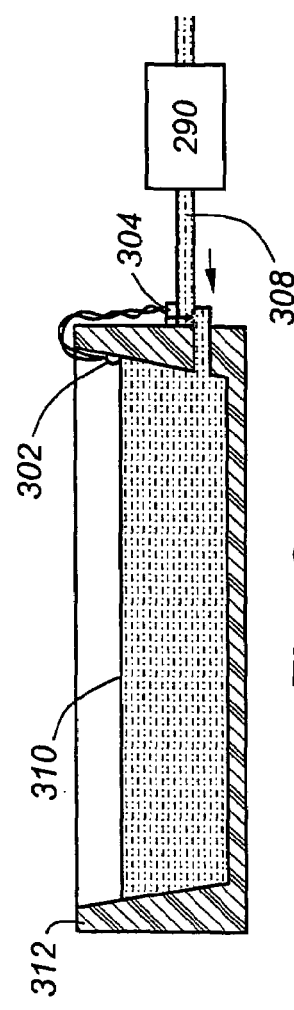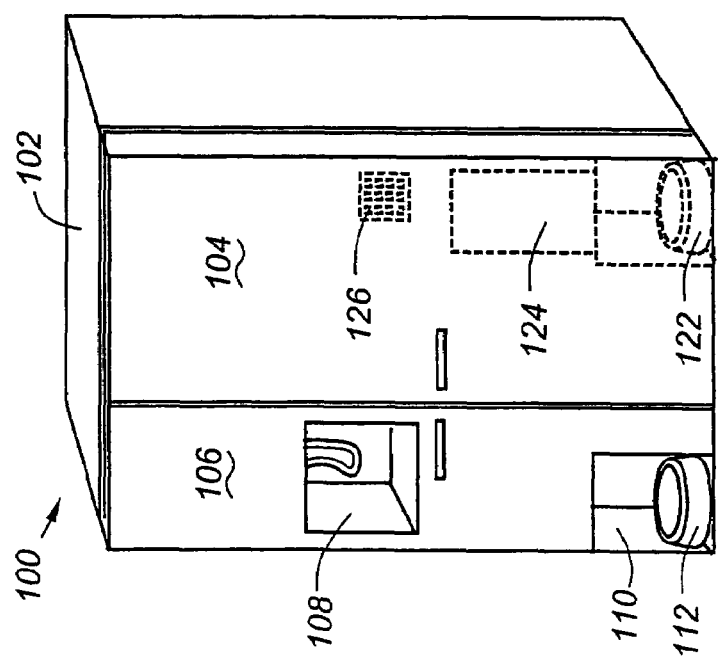

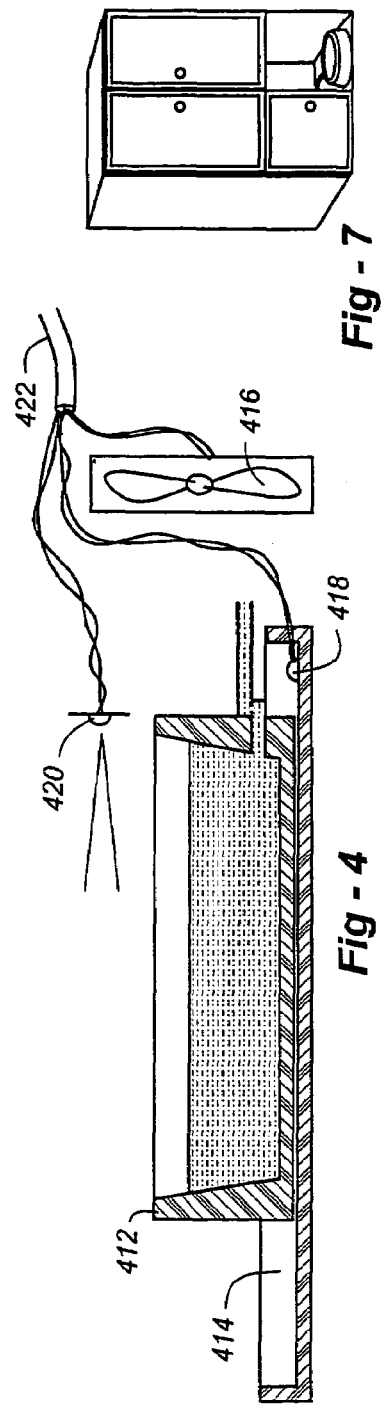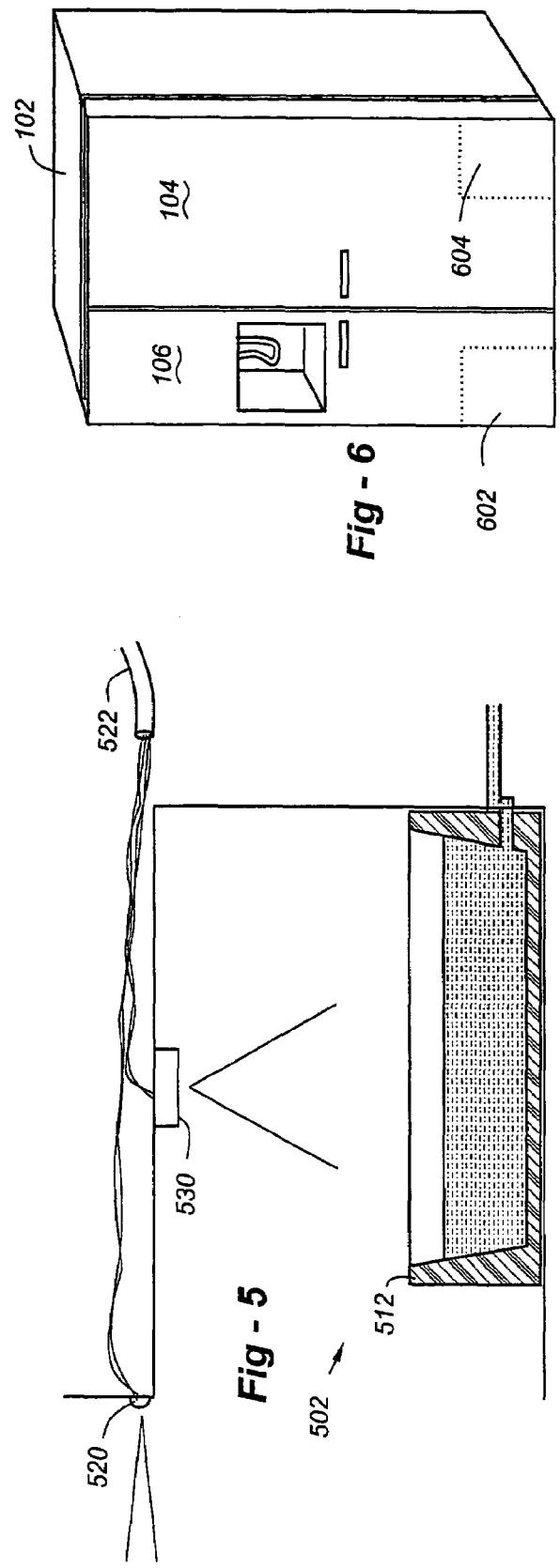

COMBINATION MAJOR APPLIANCE AND PET WATERING SYSTEM

FIELD OF THE INVENTION

This relates generally to pet feeding and, in particular, to a combination appliance or cabinet unit and pet watering system.

BACKGROUND OF THE INVENTION

Pet owners know that is sometimes it is difficult to keep a water bowl filled, particularly on hot, dry day. For this reason, several auto-filled bowls have been devised. U.S. Pat. No. 4,470,371, for example, describes a watering device particularly adapted for use by animals. A valve is provided for maintaining the liquid level within the reservoir and the entire device is so designed that it cannot be accidentally upset by the animal. Outwardly extending from a threaded portion of valve housing is a slightly tapered shank portion, sized so as to form a snug fit when inserted into the interior of a common garden hose.

The animal drinking water supply apparatus disclosed in U.S. Pat. No. 5,452,683 includes a cylindrical container in the form of a culvert with a flexible bowl inserted into one end of the culvert so that a horizontal upper edge of the bowl engages over the edge of the culvert with the bowl sitting inside the culvert. A transverse support member is connected across the inside of the culvert to support the base of the bowl. The support member comprises a rectangular tube within which is provided a liquid heat transfer medium and a heating element so that the upper surface of the support member upon which the bowl rests is heated to avoid freezing of the water. The depth of water is maintained within limits by a micro switch detecting the flexing of the bowl in dependence upon the weight of water.

U.S. Pat. No. 5,782,202 resides in an improved watering dish for use with dogs and other animals. The watering dish is self-cleaning, and is provided with a float-activated valve that automatically replenishes the water supply in the drinking reservoir as that supply is depleted. The float is constructed so that it will not flip or otherwise become fouled, even if the watering dish is overturned. The valve is constructed so that it may be shipped as a separate element, but readily snaps into position in the watering dish during assembly and is thereafter essentially permanently fixed into place in an orientation conducive to the optimal performance of the device. The watering dish is also provided with fastening elements that permit it to be affixed to both vertical and horizontal substrates. The fastening means also allow the device to be attached to both hard and soft surfaces.

The animal water dispensing apparatus described in U.S. Pat. No. 6,119,628 includes a molded plastic base member which has a reservoir support portion and a water receiving recess connected to receive water from a reservoir with a stainless steel liner for the recess being formed with small apertures to allow water to flow into the liner.

A pet food dispenser described in U.S. Pat. No. 6,145,473 comprises a base, a bowl mounted on the base for retaining a quantity of a substance to be dispensed, a reservoir mounted adjacent one side of the base and operable to deliver a desired substance into the bowl, and a cover movable into and out of a position to cover the bowl.

U.S. Pat. No. 6,205,950 discloses a device for watering pets, e.g., a dog or cat having the general shape of a toilet. The device comprises a base, a bowl for holding water, and a tank-like structure for holding dry goods, e.g., dog food, which tank also is equipped with a lid. A compartment for holding a heating media, e.g., gel, is shown underneath the bowl in order to heat the bowl. An alternative embodiment discloses a bowl with a seat with hinges on top of the bowl which seat is selectively placed in the up or down position.

U.S. Pat. No. 6,463,880 includes a bowl for containing drinking water for a pet animal, the bowl including a first surface at least partially defining a depression for holding the drinking water and a second surface exposed to air, the first and second surfaces being separated by a water permeable material so that water may pass through the first surface to the second surface, and wherein evaporation of water from the second surface acts to cool the drinking water contained within the depression.

Although certain of the inventions just described provide automated watering apparatus, problems arise with connection to the source. At least one reference mentions refrigeration, it is to provided chilled water for livestock. According to U.S. Pat. No. 5,138,890, an animal feeder is provided for delivering temperature-regulated liquid feed to one or more animal feed sites. A refrigerated or heated reservoir stores the liquid feed, and one two or three conduits lead from the reservoir to a feed dish which has a bowl portion and a heat exchange portion. A conduit supplies the bowl through a float valve which maintains the liquid in the bowl at a predetermined level. Conduits also circulate liquid through the heat exchange chamber which serves to cool or heat the solid and/or liquid feed in the bowl.

SUMMARY OF THE INVENTION

This invention assists pet owners by providing a combination major appliance and automatically refillable water bowl. The automatically refillable water bowl further includes a liquid level sensor and a valve in fluid communication between the bowl and a source or water. The valve may be electrical or mechanical. In the preferred embodiment the major appliance is a refrigerator freezer with plumbing to an ice maker or other accessory to which the bowl can interconnect, though the invention is equally applicable to other appliances such as non-combined refrigerators and freezers, stoves, ranges, dishwashers, trash compactors, and cabinet units.

Various optional accessories are disclosed, including a fan for drying water spilled from the bowl. The water filter provided with the refrigerator/freezer, or a separate filter may optionally be provided. The fan may be used for another purpose in the appliance, as in a condensing unit, or may be provided separately. A sensor may be included to disable the fan in the presence of a pet. The appliance preferably includes a cavity into which the bowl is situated, along with an optional light for illuminating the cavity. Again, a sensor may be provided to activate the light in the presence of a pet. The invention may be factory installed or provided as an option or after-market add-on. As such, the appliance may include a knock-out panel exposing a cavity into which the bowl is situated. A dry or wet pet food dispenser may also be provided, on the refrigerator side of the appliance, for example, preferably with a timer to dispense food at user-dictated intervals and/or amounts.

BRIEF DESCRIPTION OF THE DRAWINGS

FIG. 1 is a drawing depicting the preferred embodiment of the invention from an oblique perspective;

FIG. 2 is a drawing which shows a cross section of a valve arrangement according to the invention;

FIG. 3 is a cross section that shows an alternative electrically operated valve arrangement according to the invention;

FIG. 4 is a drawing which shows a drawing fan and other optional features;

FIG. 5 is a drawing that shows an infrared-activated courtesy light;

FIG. 6 is a drawing which shows how the invention may be implemented through knock-out panels; and FIG. 7 illustrates a combination base cabinet unit and integrated automatically refillable watering bowl.

DETAILED DESCRIPTION OF THE INVENTION

FIG. 1 illustrates generally at 100 a preferred embodiment of the invention, wherein a refrigerator 102 includes an automatically filled water bowl 112 disposed in a cavity 110. Although not necessary to the invention, the bowl 112 is provided in conjunction with a refrigerator/freezer combination (106, 104), including an automatic ice maker 108, since with such a configuration, the appliance is already "plumbed" to receive fresh water. However, given the inventive combination of an automatically refilled water bowl in conjunction with a kitchen appliance, such a system may be provided with a refrigerator only, a freezer only, even appliances such as a dishwasher, range, stove, or trash compactor, whether plumbed in advance or not. In addition, although the bowl 112 is shown in a cavity 110, a cavity is not absolutely necessary, in that the bowl may be situated outside of the appliance, on the floor, for example. As an option, a dry/wet pet food bowl 122, filled from dispenser 124, may provided in the refrigerator side of the appliance, for example, and controlled by a digital timer 126 or analog control (not shown). Vertical as opposed to side-by-side units may also be accommodated, and FIG. 7 illustrates a combination base cabinet unit and integrated automatically refillable watering bowl.

FIG. 2 is a drawing which shows automated refill apparatus according to the preferred embodiment. A bowl, 212, shown in cross section, includes a float 202 which is hingedly affixed through linkages 206 to a valve 204, shown in simplified form. With such a configuration, as the water level 210 rises, so, too, does float 202, causing the plunger of valve 204 to move downward and seat the valve, thereby closing off the supply of water through line 208. Again, if the invention is provided in conjunction with a refrigerator/freezer having a plumbed ice maker, line 208 would tap into that same plumbing. As an option, a changeable or permanent water filter 290 may be placed in the water line.

As an alternative to a mechanically-operated refill apparatus, FIG. 3 shows an electrically operated configuration in conjunction with a bowl 312 having a sensor 302 that detects water level 310, causing an electrically operated valve 304 to open and close. Sensor 302 may be of any appropriate design, including an optical sensor, moisture sensor, and the like. One disadvantage of such a design, however, is that electrical connections are required, and should the electrical connections fail, the bowl may be overfilled.

Since it may be assumed that some animals, such as larger dogs, would splash the water from the bowl, a receiving tray 414 may be provided, as shown in FIG. 4. Bowl 412 will be placed thereinto. As an option, a fan 416 may be used to dry the tray 414 should any of the water spill thereinto. The fan 416 may be already located in the refrigerator, and may be used for operating the condensing unit, for example. Alternatively, a separate fan may be provided in conjunction with the invention. The fan may be on continuously, may operate at intermittent predetermined intervals, or sensors such as a moisture sensor 418 may be used to turn it on and off. So as not to scare an animal, an infrared detector or other sensor 420 may be used to turn the fan off, at least temporarily, while the pet is drinking from the bowl.

As a further option, FIG. 5 illustrates the use of a courtesy light 530, which, again, may be turned on by an infrared sensor 520, thereby lighting the bowl 512 in an otherwise darkened cavity 502. As with the other electrically operated embodiments of the invention, wiring 522 would be routed to the power supply forming part of the refrigerator system.

To enhance marketing effectiveness, refrigerators according to the invention may be provided with one or more knock-out panels, enabling a purchaser to decide at the time of purchase (or manufacture) whether or not they would like to have a pet watering apparatus as an option. If so, through the payment of a surcharge, much like that incurred with an automatic ice maker, a distribution outlet or the manufacturer itself may knock out panels such as 602 or 604 in FIG. 6, and install a separate unit of the type depicted in FIG. 1. Clearly, since it would be problematic to move the bowl as the door into which the bowl is inset, resulting in splashing and other problems, according to the invention the hinges of the respective door associated with the feeding apparatus would be located so that the bowl remains physically stable as the doors open and close to minimize spillage. At the same time, it is anticipated that the hose connection to the bowl is sufficiently long that the bowl may be manually pulled out from the refrigerator/freezer or other appliance to wash the bowl from time to time.

We claim:

1. A pet watering system, comprising:
   a food refrigerator or food freezer or combination food refrigerator and food freezer resting on a floor and including plumbing receiving water from an external source;
   an automatically refillable water bowl coupled to the plumbing, the bowl being disposed on or near the floor for access by a pet;
   a liquid level sensor; and
   a valve in fluid communication between the bowl and the source of water to add water to the bowl in response to the level detected by the sensor.

2. The pet watering system of claim 1, wherein:
   the food refrigerator or food freezer or combination food refrigerator and food freezer includes a fan; and
   the fan is oriented to dry water spilled from the bowl.

3. The pet watering system of claim 1, further including:
   a fan for drying water spilled from the bowl; and
   a sensor to disable the fan in the presence of a pet.

4. The pet watering system of claim 1, wherein the major appliance includes a cavity into which the bowl is situated.

5. The pet watering system of claim 1, wherein:
   the food refrigerator or food freezer or combination food refrigerator and food freezer includes a cavity into which the bowl is situated; and
   a light for illuminating the cavity.

6. The pet watering system of claim 1, wherein:
   the food refrigerator or food freezer or combination food refrigerator and food freezer includes a cavity into which the bowl is situated;
   a light for illuminating the cavity; and
   a sensor to activate the light in the presence of a pet.

7. The pet watering system of claim 1, wherein the food refrigerator or food freezer or combination food refrigerator and food freezer includes a knock-out panel exposing a cavity into which the bowl is situated.

8. The pet watering system of claim 1, wherein the liquid level sensor is a float.

9. The pet watering system of claim 1, further including a tray under the bowl to collect water spilled from the bowl.

* * * * *